Sept. 27, 1966 A. P. HENRY 3,275,017
THREE-STAGE SERVO VALVE
Filed March 3, 1964 3 Sheets-Sheet 1

INVENTOR.
AUGUSTUS P. HENRY
BY
*Philip Subkow*
ATTORNEY

Sept. 27, 1966  A. P. HENRY  3,275,017
THREE-STAGE SERVO VALVE
Filed March 3, 1964  3 Sheets-Sheet 2

INVENTOR.
AUGUSTUS P. HENRY
BY
*Philip Subkow*
ATTORNEY

Sept. 27, 1966    A. P. HENRY    3,275,017
THREE-STAGE SERVO VALVE
Filed March 3, 1964    3 Sheets-Sheet 3

AUGUSTUS P. HENRY
INVENTOR.

BY Philip Subkow

ATTORNEY

# United States Patent Office 3,275,017
Patented Sept. 27, 1966

3,275,017
THREE-STAGE SERVO VALVE
Augustus P. Henry, Camarillo, Calif., assignor to American Brake Shoe Company, New York, N.Y., a corporation of Delaware
Filed Mar. 3, 1964, Ser. No. 349,002
6 Claims. (Cl. 137—83)

This invention relates to improvements in servo valves in which the fluid output from the valve is made responsive to an input signal to the valve. Such valves in the prior art are characterized by employing a first-stage pilot valve which valves fluid to a second-stage valve to control the second stage, which in turn, valves the fluid so that the fluid output may be controlled. The pressure on the fluid from the first stage valve acts as a control fluid pressure and is applied to control pressure chambers in communication with the second stage valve. This control pressure causes the second stage valve to vary a port opening to control the fluid output from the second stage valve. The magnitude of the control pressure applied from the first stage valve is made responsive to the magnitude and direction of the signal force, and thus the output from the second stage may be made responsive to the signal force.

Typical of such valves, are valves which include spool valves acting as a first-stage valve, and also includes first stage valves in which the control pressure is obtained by bleeding fluid pressure applied to each end of a second stage spool through a variable orifice. Example, are valves in which the bleed orifice is controlled by a flapper whose position is made responsive to the input signal. Such valves are shown in the Patents to Moog, No. 2,931,343 and 2,767,689 and Baltus, 2,947,286. A different type of valve employing a jet as a first stage valve, is shown in the Atchley Patents 2,884,906 and 2,884,907. In certain of these patents, particularly the Atchley patents, a force feedback means is provided in which the movement of the second stage valve is fed back to generate a force which tends to oppose the signal force to bring the first stage to the null position. In such a system, the control pressure may be only a fraction of the pressure at the output of the second stage valve. In this sense, the system constitutes an hydraulic amplifier.

In usual practice, such valves are designed to deliver a given volumetric rate of flow for a given signal against a selected pressure difference across the load ports. For purposes of description, this volumetric rate of flow under such conditions, is here referred to as power output.

The difficulty with such valves is that, as the size of the second stage is increased, in order to increase the power output, the dynamic response of the overall arrangement decreases markedly.

Thus, it is desirable, in such a system, that the power spool which valves the fluid from the valve system to its point of use, shall correspond in phase and amplitude to the phase and amplitude of signal which controls this spool movement. This fidelity of response depends on a suitable natural frequency and damping ratio of the system.

The dynamic response of a two stage force feedback valve, of the type, for example, shown in the above referenced patents, is dependent upon the size of the second stage spool and the first stage quiescent leakage flow. As the physical size of the second (output) stage spool is increased, an increased volumetric rate of fluid flow from the first stage valving element is required to effect rapid displacements of the output stage spool. Therefore, in order to achieve high dynamic response in a large output two stage valve, very high quiescent flows with attendant high parasitic power drain through the first stage valving element are necessary.

I have now devised a valve of the servo valve type employing the systems similar to those described above in which I can achieve very high output power delivery with substantially higher dynamic response than is presently possible in a two stage servo valve of like power output, and with minimum quiescent leakage flow from the first stage valving element.

It is an object of my invention to design a force feedback servo valve of large power output, whose dynamic response shall be higher than that of a similar two stage valve of like power output.

It is a further object of my invention to design a servo valve of any desired power output, the first stage, of which shall require a minimum quiescent leakage flow.

It is still further an object of my invention to design a servo valve of any desired power output level in which the natural frequency and damping ratio may be adjusted within practical limits.

I accomplish these objectives by introducing an additional valve element between the first stage valving element and the output stage valve element. The load ports of the intermediate (second stage) valve are now connected to the control pressure chambers of the output (third stage) spool valve. Thus, there is provided an additional stage of hydraulic power amplification.

Means are provided to effect a positive, mechanical interstage feedback within the structure of the device. The spools, i.e., the spools of the second stage and third stage valving elements are connected through a force feedback link to the signal source, for example, by a spring which is connected to the flapper or jet type as indicated in the cited patents, and also to each other. In the preferred form of my invention, the motion of the second stage valve and third stage valve are fed back to the first stage signal source by means of a rigid summing link one end of which is transported by second stage spool displacement and the other end of which is transported by third stage spool displacement and with force feedback to the first stage valving element through a complaint link connected at one end to the first stage valving element and the other end to an intermediate point of the rigid summing link.

This invention will be further described by references to the drawings of which:

Figure 7:
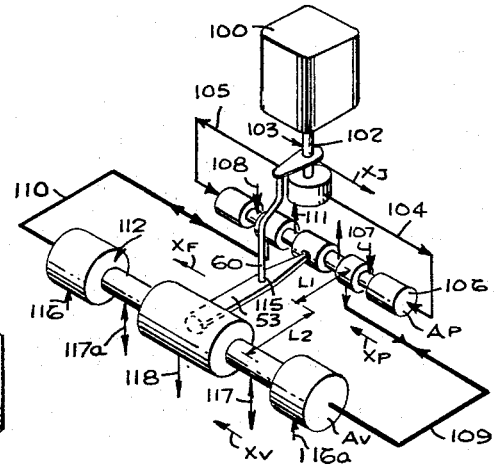
FIG. 7 is a schematic illustrating the principle of my invention.
Figure 2:
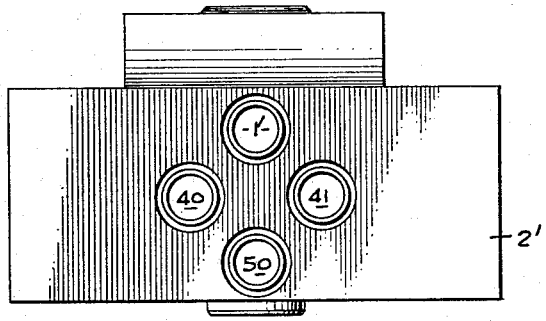
FIG. 2 is an end view taken on line 2—2 of FIG. 1.
Figure 4:
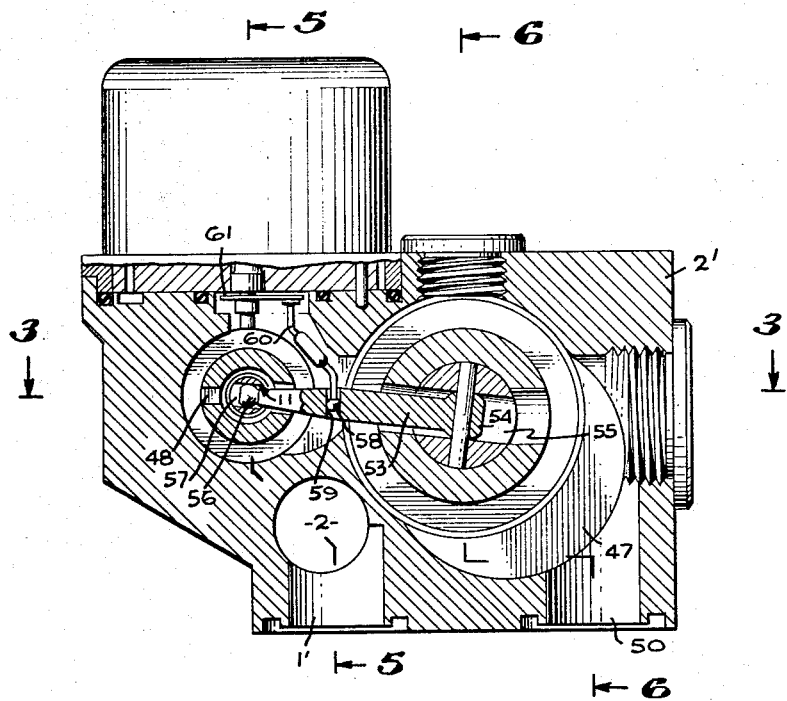
FIG. 4 is a section on line 4—4 of FIG. 3.

Without limiting my invention which is claimed in the following claims, FIG. 7 illustrates the principles of my invention in schematic form. One is a device, for example, a transducer for causing a displacement of an element 102 responsive to the signal force imposed on 100. 102 is a first stage valve element which is displaced against some opposing restraining force. Such a device may be a fluid force, mechanical force, or an electro-mechanical force, for example, a torque motor as described in the Atchley Patents 2,884,906 and 2,884,907. It may be a solenoid of any other device capable of displacing the valve element 102 to a degree proportional to a signal force. The displacement of 102, valves fluid from a high pressure source shown at 103, through the conduits 104 or 105. Assume, when the element 102 moves to the right through a distance $x_J$, the first stage valve 102 valves fluid so that pressure in the conduit 104 becomes larger than in the conduit 105, and the pressure exerted against the piston end of the spool 106, of cross-section area $A_P$, is greater than against the other end of the spool 106, which has a similar cross-sectional area $A_P$. This causes the spool 106 to be displaced to the left, to a distance $x_P$. The displacement of the spool 106 valves fluid from a high pressure source to the input port 107, into the conduit 109. The movement of the spool 106 connects conduit 110 to the return line 111 and blocks off the input port 108. There is thus a higher pressure exerted against the right hand end of the third stage spool 112 of cross-sectional area $A_V$, then against left hand of like cross-sectional area. This causes displacement of the spool to the left as indicated by $x_V$. The displacement of the spool 106 ($x_P$) and spool 112 ($x_V$) results in the movement to the left of the inter-connected rigid link 53, to a degree $x_F$. A flexible link 60 is connected at 115 at a distance $L_2$ from the connection of the link 53 to spool 112, and at a distance $L_1$ from the connection of link 53 to the spool 106. The flexible link 60 is also connected to the element 102 so that a movement of the link at 115, to the degree $x_F$ is sufficient to exert a force on 102, which will overcome the signal force. The element 102 is thus returned to neutral position equalizing the pressures 104 and 105, 109 and 110, to hold the spools in their displaced position so long as the signal force is exerted on 102. The displacement of the spool 112 valves fluid from the input port 116, into the load port 117a, and connects the other load port 117 to the return port 118.

It will be understood that the reverse movement of the element 102 i.e., to the left will reverse the movements of the spool 106 and 112, and will connect the high pressure source 116a to the output load port 117, and will connect 117a to the return port 118 while blocking the other high pressure source port 116.

In the above configuration, a three stage hydraulic amplification of the control flow occurs. Thus, the flow exiting from the second stage spool is greater than that generated in the first stage valve element i.e., at 104 or 105, by the amplification of the second stage spool, and the flow at the output ports of the third stage spool at 117 or 117a is greater than the flow in lines 109 and 110, by the amplification in the third-stage spool. The natural frequency "$f$" of such a system is given by the expression $$f = \frac{1}{2\pi}\left[\frac{L_1 K_f}{(L_1+L_2)(K_a+K_f)t_v t_p}\right]^{1/2}$$

and the damping ratio H by the following expression:

$$H = \frac{L_2}{2}\left[\frac{K_f t_v}{L_1(L_1+L_2)(K_a+K_f)t_p}\right]^{1/2}$$

where $L_1$ is the distance between 115 and the connection of 53 to 106, and $L_2$ is the distance between 115 and the connection of 53 to 112, as indicated on FIG. 7. $K_f$ is the spring rate of the flexible rod 60 i.e., the Hooks Law constant, and $K_a$ is the spring rate of the element 102, and the transducer 1, such that:

$$t_v = \frac{A_v}{C_p} \text{ and } t_p = \frac{A_p}{C_j}$$

where $C_j$ is a flow rate through the lines 104 and 105 per unit displacement of the element 102, and $C_p$ is the flow rate through the lines 109 and 110 per unit displacement of the spool 106. For any given design of the system, and for any given supply pressure, the frequency ($f$) is proportional to $$\left[\frac{L_1}{L_1+L_2}\right]^{1/2}$$

and the damping ratio (H) is proportional to $$\left[\frac{L_2^2}{4L_1(L_1+L_2)}\right]^{1/2}$$

By varying the ratio of the $L_1$ to $L_2$, I may vary the natural frequency and the damping ratio of the system. For example, by decreasing the ratio of $L_1$ to $L_2$, the natural frequency increases and the damping ratio decreases, as compared to a prior art two-stage valve of the same power output and flow i.e., volume and pressure of the output flow of the load ports.

The linkage between the second and third-stage valve constitutes a mechanical summing means to sum the displacement of the second and third-stage valves. By linking the second and third stage to the element 102, by means of the spring 60, the force feedback to the first-stage valve element 102, is made dependent on the sum of the movement of the second-stage and third-stage valves, in amounts depending upon the ratios of the length of $L_1$ to $L_2$. As stated above, and as will be more fully described below, this permits an adjustment of the natural frequency and damping ratio by adjustment of the link geometry.

FIGS. 1 through 6 illustrate an embodiment of my invention employing as a first-stage and second-stage, the form of the Atchley valve shown in the above patents. FIGS. 1 through 6 illustrate the system when no signal is impressed and with all control pressures at the first and second-stage spools balanced.

The fluid input from a suitable high pressure source enters at 1', (see FIGS. 2, 4 and 6) and passes through manifold passageway 2. Pressure is exerted through the ports 3, 4, 5 and 6 (see FIGS. 3 and 5), between the lands 9 and 10, and between the lands 7 and 8. The control pressure ports 29 and 30 are covered by the lands 8 and 10.

Figure 5:
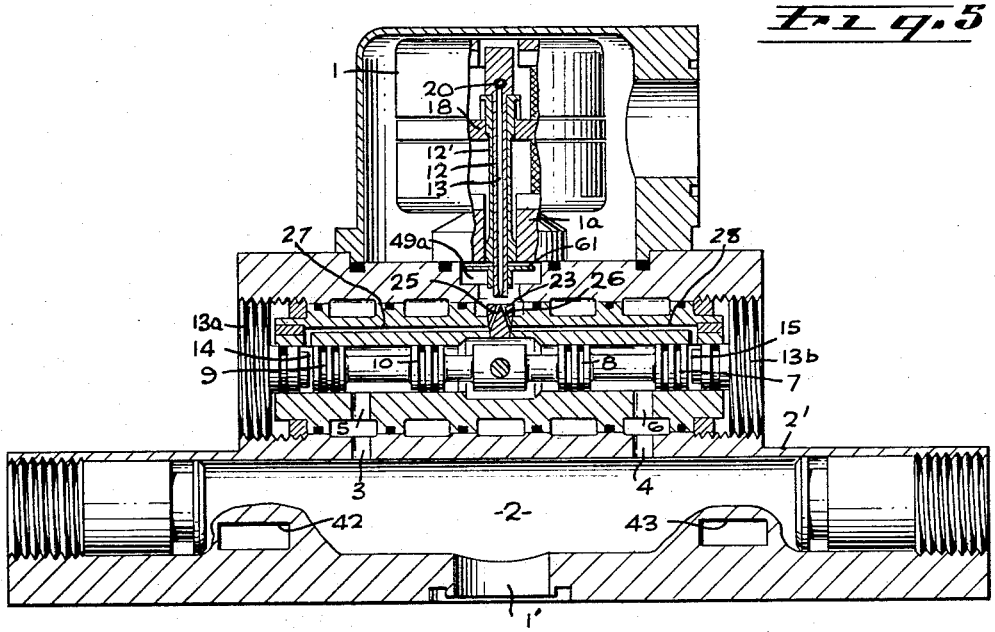
FIG. 5 is a view partly in section and partly in elevation on line 5—5 of FIG. 4.
Figure 6:
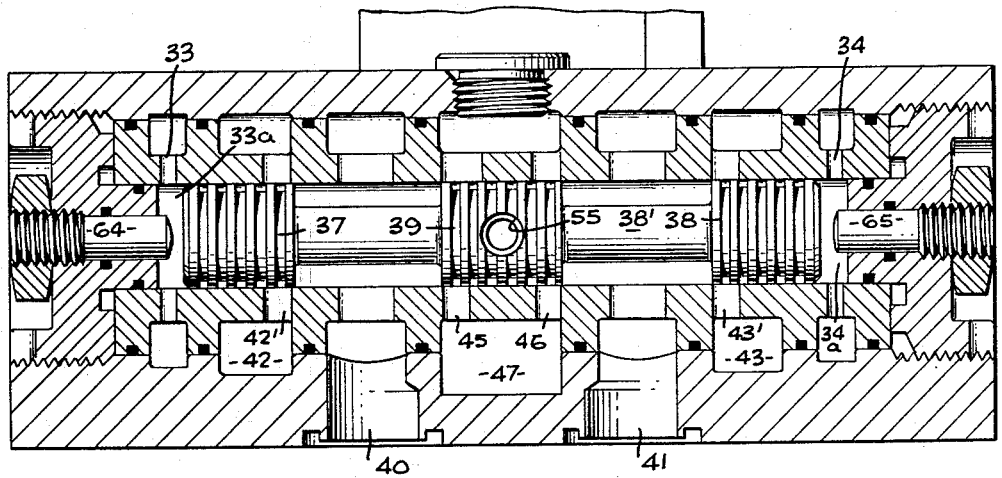
FIG. 6 is a section on line 6—6 of FIG. 4.

The input pressure from 2 is also exerted through a conduit connected to the manifold 2, and through a flexible pipe (not shown) connected to the bore 20 at the top of the pipe 12 (see FIG. 5). The input fluid passing through the bore 13 exits out of the end of the pipe where it impinges on the two receptor jets 25 and 26, in the fixture 23. The pipe 12 is suspended at its top in a thin walled flexible tube 12' which is fixed at the bottom to base 1a. The tube 12 is connected adjacent its top to the armature 18 of the torque motor 1. For a further description of this assembly, see the Atchley Patents 2,884,906, 2,884,907 and 3,017,864 which are hereby incorporated in the specification by this reference. With no signal to the torque motor, bore 13 is centrally positioned between the receptor jets 25 and 26, and equal pressures are exerted through the control conduits 27 and 28 into the control chambers 14 and 15, at the ends of the lands 7 and 9, closed by the plugs 13a and 13b. The spool 11 is thus centrally positioned. The excess fluid exiting from the end of the the bore 13 passes into the space 49a (see FIGS. 4 and 5), and through the bore 48 (see FIGS. 3 and 4), to the return port 50 (see FIGS. 2, 3 and 4). The input pressure in 2 also passes through the ports 42 and 43 (see FIGS. 5 and 6), and is exerted through the ports 42 and 43, blocked by the lands 37 and 38 of the spool 38'. The return ports 45 and 46, blocked by land 39, communicate with the annular chamber 47 and the return port 50, (see FIGS. 2, 4 and 6). The control chamber 33a at the end of the land 37 of the spool 38', and the control chamber 34a at the end of the land 38, communicate through ports 33 and 34, with the ports 29 and 30, through the conduits 31 and 32 (see FIGS. 3 and 6). The load ports 40 and 41 are positioned between the central land 39 and the lands 37 and 38 of the spool 38'.

Figure 3:
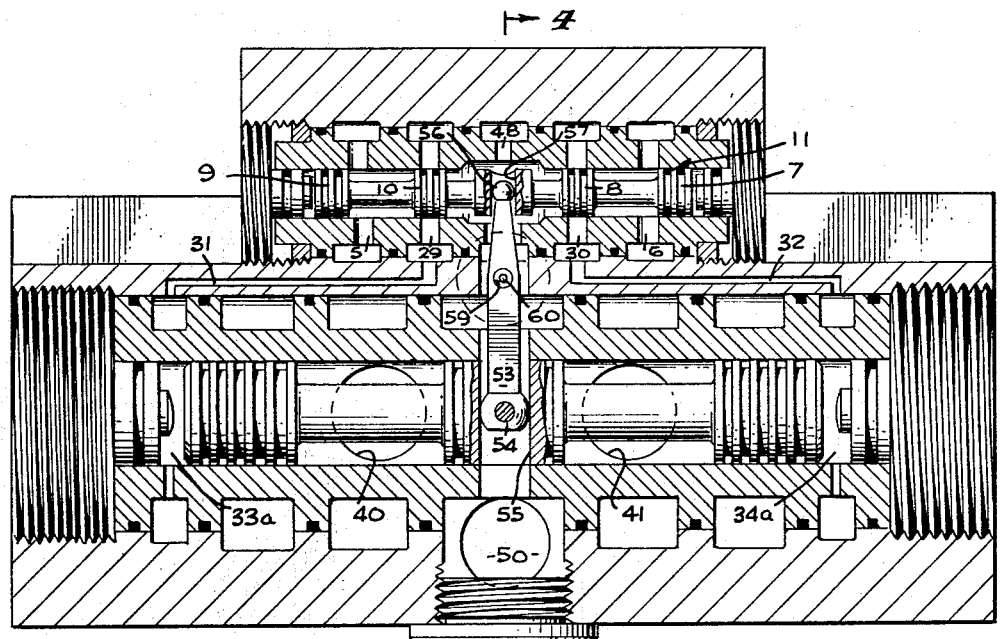
FIG. 3 is a section on line 3—3 of FIG. 4.
Figure 1:
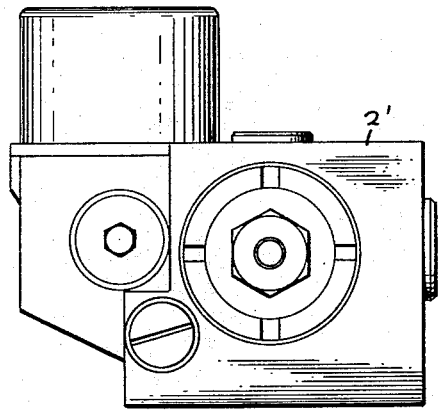
FIG. 1 is an end view of a preferred embodiment of a preferred mode for carrying out my invention.

The land 39 is provided with a bore 55 and the spool 11 is provided with a bore 57 (see FIG. 3). The rigid link 53 terminates in the ball swivel 54 in the bore 55, and by a ball swivel 56 in the bore 57. The flexible rod 60 (see FIG. 4) has a ball end 58 which is positioned in the bore 59, in the link 53 and is rigidly connected to the plate 61 (see FIGS. 4 and 5), which in turn, is rigidly connected to the end of the tube 12. The entire structure is suitably encased in the housing 2' (see FIG. 4). The function of the device will be readily understood by reference to the schematic description described in connection with FIG. 7.

If a signal current is imposed on the torque motor, the armature 18 is deflected, causing a deflection of the tube 12'. Assume that this occurs to the right, as shown in FIG. 5. The degree of this deflection $x_J$ of FIG. 7, will depend on the stiffness of the armature suspension which is in part made up the stiffness i.e., spring rate of the tube 12' and the usual flexure support for the armature 18 (see the above Atchley patent). This spring rate is the constant $K_a$ referred to above. It also depends on the stiffness $K_f$ of the spring 60 (see 60 of FIG. 7). The displacement of the spools $x_v$ and $x_p$ result in the spring force which opposes the electromagnetic force, causing deflection of the armature. The displacement of the tube 12 to the right, causes a greater impingement of the fluid entering from 12 on the receptor jet 26, than on the receptor jet 25, causing a flow of fluid through 28 to the control chamber 15. This causes the displacement of the spool 11 to the left. This is the value $x_P$. A reverse flow from the chamber 14 occurs through the conduit 27, and the receptor jet 25, into the space 49a and the return port 50. The quantity of fluid passing through 28 from the jet 26 to the chamber 15, per unit displacement of the tube 12, is the factor $C_j$.

The displacement of the spool 11 to the left, uncovers the port 30 (see FIGS. 3 and 4), and connects it to the input port 6. The ports 30 and 29 are characterized ports in that port opening increases proportionately to the displacement of the spool. Thus, a pressure difference is established through the conduits 31 and 32, and the control pressure chambers 33a and 34a. The result is a flow of fluid into the control chamber 34a, and the flow from the control chamber 33a through port 29 to the return port 48. The volume flow through conduits 31 32 per unit of displacement $x_p$ of the spool 11 is the value of $C_p$.

The displacement of the spool 38' to the left, connects the input from 1' through the manifold 2, the port 42 and 42', to the load port 40, and by blocking port 43, connects the load port 41 to the return 50 through the ports 46 and the space 47.

The load ports 40 and 41 are connected to any operative mechanism such as an hydraulic motor, the high pressure input, and return line of the motor being connected to the ports 40 and 41.

Except for the feedback links from the second and third-stage, the existence of the pressure difference in chambers 14 and 15, and 33a and 34a, would move both spools to the left and against the stops 13a and 64. The imposition of the force feedback permits a control of the degree of spool displacement, and therefore, the degree of the openings of the ports 42 and 43 (see FIG. 6), responsive to the signal force imposed on the pipe 12.

The movement of the spools continue until the resultant spring force generated in spring 60 when added to the spring force of the armature and suspension of the pipe 12, balances the signal force.

The system may be designed with a negative magnetic spring constant which balances the mechanical spring constant of the suspension of the armature and pipe 12 and, the constant $K_a$ referred to above, may be taken as substantially zero (see Atchley Patent No. 2,996,072). The spring force opposing the electrical magnetic force acting to displace the pipe 12, is then the opposing spring force of the feedback spring 60. The spools thus displace to the left until the deflection of the spring 60 adds a component of force to the net component of force, due to the deflection of the bore 13, balanced by the negative magnetic stiffness, to balance the signal force. The tube 12 is returned to the neutral position in the jets 25 and 26. Pressure in 14 and 15 becomes equal, with spool 11 centered isolating third stage spool control chambers 33a and 34a, with port 29 blocked by land 10 and with port 30 blocked by land 8. Third stage spool 38' is then displaced sufficiently so that the force fed back to tube 12 by spring 60 precisely balances signal force from torque motor 1".

The condition exists until the signal force changes, adding or subtracting from the original signal, causing a further deflection of the spools, further to the left to increase in the openings of the ports 42' and 43', as the signal force increases or decreasing these openings as the signal force decreases. A reversal in the direction of the signal force reverses the direction $x_J$ of the motion of the pipe 12 and the displacement $x_V$ and $x_P$ of the spools 38' and 11.

While I have described particular embodiments of my invention for the purpose of illustration, it should be understood that various modifications and adaptations thereof may be made within the spirit of the invention, as set forth in the appended claims.

I claim:
1. A three-stage servovalve comprising a first-stage valve, said first-stage valve including a fluid input port and a fluid output port in said first-stage valve and a pair of passageways connected to said first-stage valve, said first-stage valve including means responsive to a signal force applied to said first-stage valve to valve fluid from said input port into one of said passageways and from the other of said pasageways to said outlet port from said first-stage valve, a second-stage valve, said second-stage valve including a spool, control pressure chambers one at each end of said spool, said passageways connected to said chambers, a fluid inlet port and a fluid return port in said second-stage valve, a pair of control pressure passageways connected to said last named fluid inlet port and to said fluid return port, said second-stage spool valving fluid from said last named inlet port to one of said last named passageways and from the other of said last named passageways to said last named return port, a third-stage valve, said third-stage valve including a spool, a pair of control pressure chambers one at each end of said third spool, said last named passageways connected to said last named control pressure chambers, a fluid inlet port and a a fluid return port in said third-stage valve and a pair of load ports in said third-stage valve, said third-stage spool valving fluid from said last named input port to one of said load ports and from the other of said load ports to said last named return port, force feedback means from said second and third-stage spool to said first-stage valve.

2. In the valve of claim 1, said force feedback means comprising a substantially rigid link between said spools and a flexible connection between said link and said first-stage valve.

3. In the valve of claim 2, said flexible connection compirsing a flexible link connected to an intermediate port on said substantially rigid link between said spools.

4. In the valve of claim 1, said first-stage valve, comprising a pair of receptor jets one each of said jets connected to one each of said first mentioned passageways, said first-stage valve also including a pipe mounted for displacement on application of a force to said pipe, an ejector jet at the end of said pipe movable over said receptor jets.

5. In the valve of claim 4, said force feedback means comprising a substantially rigid link between said spools and a flexible connection between said link and said pipe.

6. In the valve of claim 5, said flexible connection comprising a flexible link connected to an intermediate part of said substantially rigid link between said spools.

References Cited by the Examiner
UNITED STATES PATENTS

| | | | |
|---|---|---|---|
| 3,015,313 | 1/1962 | Faisandier | 91—365 X |
| 3,023,782 | 3/1962 | Chaves et al. | 137—85 |
| 3,101,650 | 8/1963 | Blanton | 137—85 X |
| 3,211,182 | 10/1965 | Gyurik et al. | 137—625.61 |

M. CARY NELSON, *Primary Examiner.*

H. KLINKSIEK, *Examiner.*